United States Patent Office 2,713,325
Patented July 19, 1955

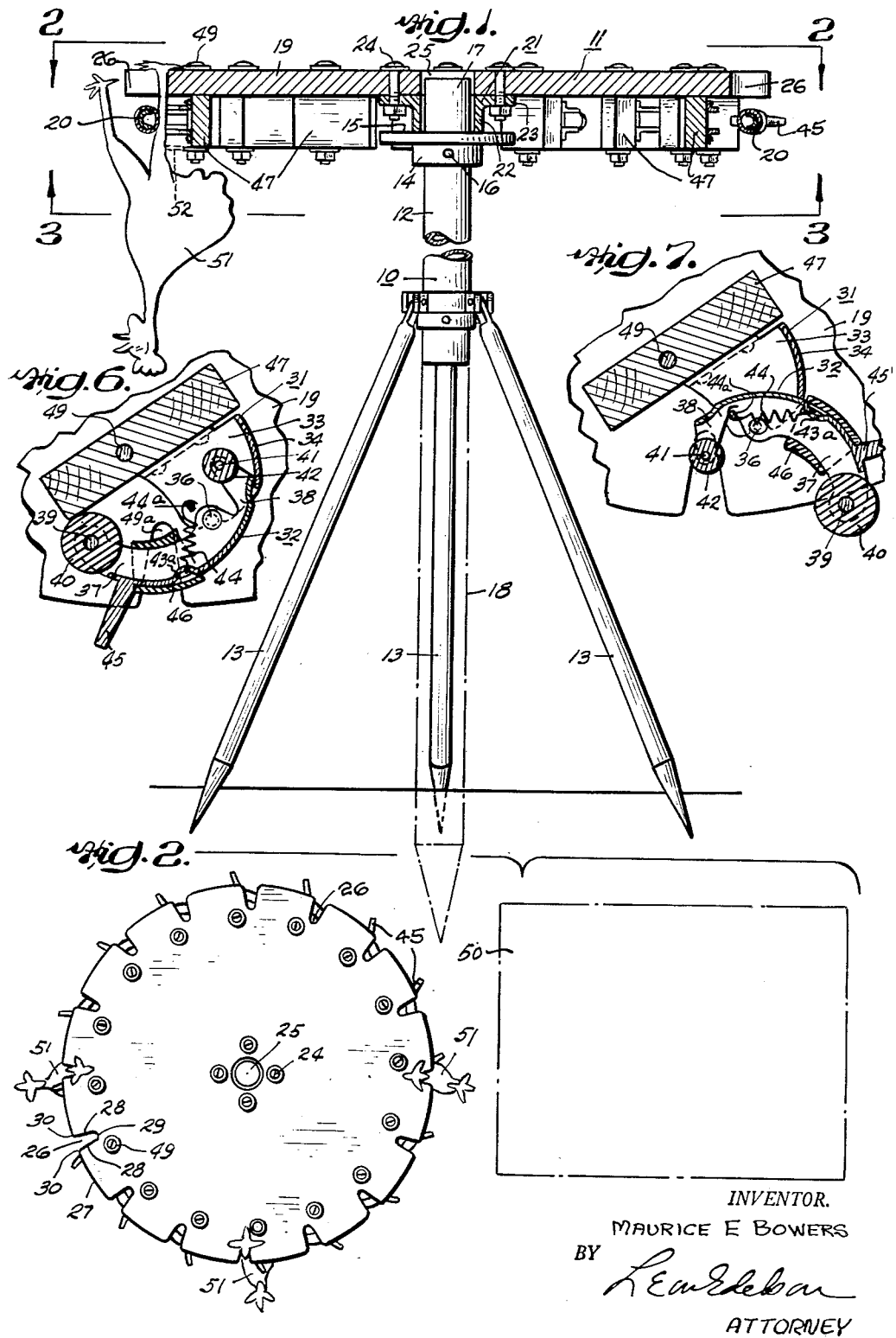

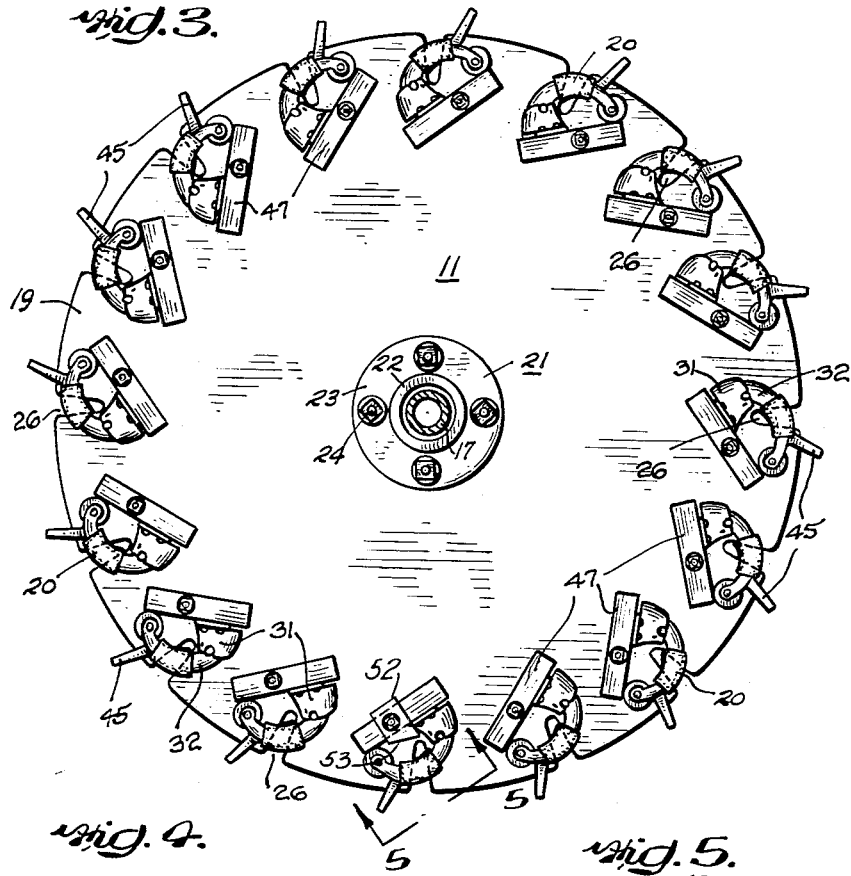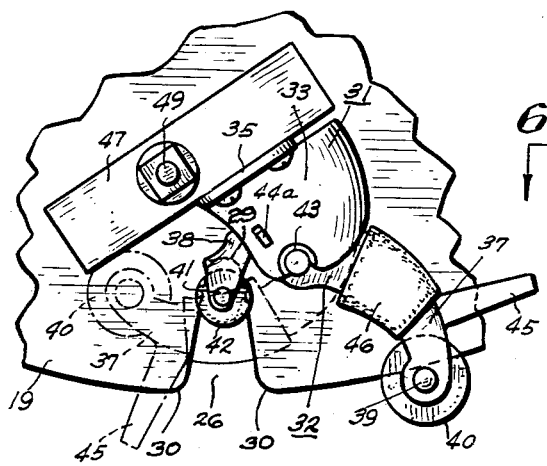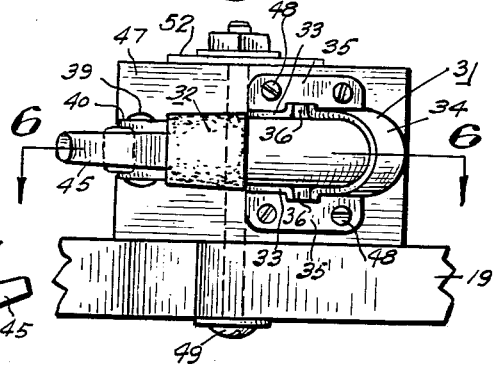

2,713,325

POULTRY-HANDLING APPARATUS

Maurice E. Bowers, Somerville, N. J.

Application September 10, 1952, Serial No. 308,774

6 Claims. (Cl. 119—97)

This invention relates generally to devices for handling a number of articles during the administration of a desired treatment and is more particularly concerned with the provision of such a device for facilitating the handling of live birds such as chickens.

A principal object of the present invention is to provide an apparatus adapted for holding in suspension independently of the operator a number of live birds during the administration of a desired treatment.

Another object of the present invention is to provide such an apparatus with means for quickly securing live birds thereto before administration of the desired treatment and for quickly releasing them therefrom after administration of the desired treatment.

Still another object of the present invention is to provide such an apparatus which is operable for successively presenting the live birds to an operator positioned at a fixed station for administering the desired treatment.

Other objects of the present invention will be apparent from the following description, it being understood that the present invention consists substantially in the combination, construction, location and relative arrangement of parts, as described in detail hereinafter, as shown in the accompanying drawings and as finally pointed out in the appended claims.

In the accompanying drawings:

Figure 1 is an elevational view of an apparatus embodying the present invention, the upper portion thereof being shown in section.

Figure 2 is a reduced plan view of the apparatus shown in Figure 1, being taken on the line 2—2 of the latter.

Figure 3 is a section on line 3—3 of Figure 1, parts being omitted for the sake of clarity.

Figure 4 is an enlarged view of one of the clamps shown in Figure 3 the clamp plate being omitted for the sake of clarity.

Figure 5 is an enlarged view on the line 5—5 of Figure 3.

Figure 6 is a section on line 6—6 of Figure 5; and

Figure 7 is similar to Figure 6 but shows the clamp in opened condition instead of in closed condition.

Referring now to the drawings, and particularly to Figure 1, it will be observed that the apparatus embodying the present invention essentially comprises a ground engaging standard 10 which revolubly mounts a rack member 11 at a convenient working height from the ground.

The standard 10 includes an upright member in the form of a tubular shaft 12 which extends above and is supported on three suitable positioned legs 13, and includes a flanged collar 14 disposed in embracing relation to a portion of shaft 12 intermediate the ends thereof. The flange of the collar 14 is provided with an upwardly presenting annular bearing surface 15 and is rigidly secured to the shaft 12 through the medium of a set screw 16, being disposed thereby with the bearing surface 15 below the uppermost end portion 17 of the shaft 12. The particular form of the standard 10 is not an essential feature of the present invention, e. g., the standard 10 might take the form of a single upright member extending from the rack 11 down into the ground. Consequently, further details relative thereto are believed to be unnecessary for a full understanding of the present invention and are, therefore, omitted.

The rack member 11 comprises a main part in the form of a flat circular member 19, preferably made of wood, and a number of clamps 20 depending from circumferentially spaced portions thereof. A fitting 21 having a cylindrical body portion 22 and an integral radially extending flange 23 which is apertured is rigidly secured to the bottom face of the member 19 through the medium of a number of bolts 24 projected through the aforementioned apertures in flange 23 and through registering apertures in the member 19, the central opening in the fitting 21 being disposed thereby to register with a central opening 25 of the same size in member 19. Circumferentially spaced portions of the latter are provided with similar radially extending notches 26 which open on the outer edge 27 of the member 19. The sides 28—28 of each notch 26 diverge outwardly, being smoothly joined to one another by a rounded bottom 29, and being smoothly joined to the outer edge 27 of member 19 by rounded surfaces 30—30.

Associated with each notch 26 is one of the clamps 20 comprising a base part 31 mounting a spring biased member 32. The base 31 is a stamped sheet metal part having sides 33—33 disposed in transversely spaced parallel planes, the sides 33—33 being joined by a back portion 34 having a double curvature, and being provided respectively with apertured flanges 35—35 extending in opposite directions from the bottom portions thereof. The member 32 includes a stamped sheet metal part which curves longitudinally, being generally semicircular in shape, and which is curved in transverse cross section. Rigidly secured to opposed side portions of the member 32 are a pair of pivot elements 36—36 disposed thereby in axial alinement and extending in opposite directions. The pivot elements 36—36 are positioned intermediate the ends of the member 32 so as to form a forwardly extending clamping arm 37 and a rearwardly extending arm 38, the latter being comparatively short. The terminal portion of clamp arm 37 is provided with a transversely extending pin 39 which mounts a hard rubber roller 40, and the terminal portion of arm 38 is provided with a transversely extending pin 41 which mounts a hard rubber roller 42.

The arm 38 of the member 32 fits snugly between the sides 33—33 of the base part 31 so that the pivot elements 36—36 are seated respectively in open notches 43—43 formed in opposed top portions of the sides 33—33. Referring particularly to Figure 4, it will be observed that the member 32 may be swung about the axis of pivot elements 36—36 between the opened position shown in full lines and the closed position shown in broken lines. Swinging movement from the opened to the closed position is limited by engagement of the terminal portion of arm 38 with the back portion 34 of the base part 31, and swinging movement from the closed to the opened position is limited by engagement of a portion of clamp arm 37 proximate the pivot elements 36—36 with the back portion 34 of the base part 31.

A tension spring 44 is mounted for reaction between the base part 31 and the member 32, being anchored at one end to a struck out portion 43ª intermediate the opposite end portions of clamping arm 37, and being anchored at the other end to a transversely extending bar 44ª which has opposite end portions suitably connected respectively to the sides 33—33 of the base part 31.

Referring particularly to Figure 6, it will be observed that when the member 32 is in closed position the longitudinal axis of spring 44 is forwardly disposed relative to the pivot elements 36—36, and referring particularly to Figure 7, it will be observed that when the member 32 is in opened position the longitudinal axis of the spring 44 is rearwardly disposed relative to the pivot elements 36—36. Consequently, when disposed in either of its extreme positions, the member 32 will be held by the action of spring 44 in such position until manually moved to the other extreme position against the force exerted by the spring 44. For moving the member 32 from one position to the other, a handle 45 is formed integral with the clamp arm 37 proximate the roller 40, a portion of clamp arm 37 intermediate handle 45 and pivot elements 36—36 being embraced by a sheet of resilient material 46 wrapped thereabout.

The clamp 20 is rigidly mounted on a block 47, preferably made of wood. The flanges 35—35 of the base part 31 are seated upon a wide face of the block 47 and are secured thereto through the medium of screws 48 projected through the apertures in flanges 35—35 and into the block 47. The latter is rigidly secured to the bottom face of the member 19 through the medium of a bolt 49 projected through registering apertures in the block 47 and in the member 19 and by suitable nailing (not shown). When thus secured, a side edge of block 47 abuts the bottom face of the member 19, and the clamp 20 extends in spaced parallel relation to the member 19.

Referring particularly to Figures 3 and 6, it will be observed that each clamp 20 and its block 47 are angularly disposed relative to the associated notch 26 so that in the closed position of the member 32 the clamping arm 37 extends across the notch 26 for effectively closing the notch, leaving an opening 49ª defined by the bottom 29 of the notch and the proximate edge of the resilient material 46. Now referring to Figure 7, it will be observed that each clamp 20 and its block 47 are further angularly disposed relative to the associated notch 26 so that in the opened position of the member 32 the roller 42 registers with the innermost portion of the notch 26, being positioned outwardly of the rounded bottom portion thereof.

In using the apparatus embodying the present invention, the standard 10 may be suitably arranged near a crate 50 containing the live birds 51 that are to undergo treatment, and the rack member 11 is lowered over the standard 10 so that the lower circumferential edge of the fitting 21 is seated upon the bearing surface 15 of the collar 14, and the upper end portion 17 of shaft 12 engages the central opening in the fitting 21 and the opening 25 in the member 19. The fit of the end portion 17 in the central opening in fitting 21 and in the opening 25 is a loose fit so that the rack member 11 may be manually turned about the axis of the standard 10.

The birds may then be removed from the crate 50 and suspended by one leg from the rack 11. Assuming that the member 32 of the clamp 20 which is to be used for suspending a bird is in opened position, the leg of the bird is inserted in the associated notch 26 and positioned in the bottom portion of the notch so that the foot of the chicken is disposed immediately above the member 19 with its toes presenting toward the open end of the notch. Then the member 32 is manually moved to closed position against the force of spring 44 through the medium of handle 45, thus causing the member 32 to swing about the pivot elements 36—36 until the roller 40 carried by the clamping arm 37 engages the block 47, at which time the leg of the bird is securely clamped between the bottom of the notch 26 and the resilient material 46 carried by the clamping arm 37.

It should be noted here that the leg of the bird may, if desired, be even more firmly clamped in position by rigidly securing to the block 47 through the medium of bolt 49 an elongated member in the form of a plate 52 (shown in Figures 1, 3 and 5), the latter being secured flatwise against the lowermost side edge of block 47 so as to provide an overhanging portion extending freely toward the notch 26. The freely extending outer edge 53 of this plate 52 is vertically spaced below the inner end 29 of the notch 26 with which the plate is immediately associated and substantially in registry therewith. Referring particularly to Figure 1, it will be observed that when the plate 52 is provided for a given notch 26, the leg of the bird is clamped between the bottom of the notch 26 and the edge 53 of the plate 52 respectively engaging spaced points on the rear side of the leg and the clamping arm 37 engaging the front side of the leg at a point intermediate said spaced points. It will be readily appreciated that the three point engagement of the bird's leg thus afforded effectively insures against any possible unintentional displacement of the leg from its clamped position.

For releasing the birds after the desired treatment or treatments have been administered, the member 32 is manually moved to opened position against the force of spring 44 through the medium of handle 45, thus causing the member 32 to swing about the pivot elements 36—36 so that the clamping arm 37 clears the notch 26 and so that the arm 38 presents the roller 42 in registry with the bottom of notch 26 for engaging the leg of the bird and positively disengaging it from the notch 26. When thus released from the rack 11, the bird drops to the ground and scurries away.

When the work at one location has been completed, the apparatus may be dismantled by simply lifting the rack member 11 from the standard 10. Then the apparatus, in dismantled condition, may be moved to a new location and set up again as hereinabove described. It will be observed that the apparatus is not only easily and conveniently assembled and disassembled without the use of tools, but is of such proportions that it may be easily transported by automobile or other carrier from one establishment to another.

It will be noted that one of the principal advantages afforded by the present invention is the time saved in administering a desired treatment or treatments to a flock of birds. In raising a flock of birds in accordance with good practice it becomes necessary at certain times to inspect them, test their blood for various purposes and to administer certain vaccines. These treatments are unduly time consuming and expensive for normally each bird must be manually restrained by an operator for the period during which the treatment or treatments last. The apparatus embodying the present invention makes it possible to materially reduce the time consumed in administering treatments to a flock of birds.

Preferably one operator, positioned at a fixed station, removes the chickens 51 from the crate 50 and loads the rack member 11. As the latter is loaded, the operator manually turns it so that the birds advance toward a second station where a second operator administers the desired treatment as the birds successively arrive at his station and then releases them from the rack. It will be observed that the second operator's hands are free for administration of the treatment and that manual restraint of the birds by him during the period of the treatment is unnecessary. If a second treatment is to be administered, the birds are not released by the second operator but are allowed to continue their advance to a third fixed station where a third operator administers the desired second treatment and then releases the chickens. Thus, it will be apparent that one or more treatments may be conveniently administered to each bird with a minimum of confusion and much saving of time and expense for the process is a continuous one, each bird being suspended during less than one revolution of the rack member 11 so that there need be no interruption in the loading of the latter.

It will be understood that the present invention is susceptible to various changes, modifications and applications which may be made from time to time without de-

What is claimed as new and useful is:

1. In a poultry treating apparatus of the character described, a table revoluble about a vertical axis for supporting poultry to be treated, said table having a plurality of circumferentially spaced notches formed in its peripheral edge, a plurality of members vertically spaced below said table and mounted in adjustable fixed relation to said notches, there being one such member for each notch, and a plurality of latches operative each to releasably clamp the leg of a bird in one of said notches with the foot of the leg disposed above said table to thereby suspend the bird from said table with its breast presenting outwardly, said table and said adjustable member being adapted to engage the back of the leg and said latch the front of the leg for effecting a three-point clamping engagement thereof to insure positioning of the leg along a line substantially paralleling the axis of revolution of the table.

2. In a poultry treating apparatus of the character described, a table revoluble about a vertical axis for supporting poultry to be treated, said table having a plurality of circumferentially spaced notches formed in its peripheral edge, means vertically spaced below said table and disposed in fixed relation to said notches, and a plurality of latches associated respectively with said notches and operative each to releasably clamp the leg of a bird in the notch with the foot of the bird disposed above the table to thereby suspend the bird from the table with its breast presenting outwardly, said table and means being adapted to engage the back of the leg and said latch the front of the leg for effecting a three-point clamping engagement thereof to insure positioning of the leg along a line substantially paralleling the axis of revolution of the table.

3. In a poultry treating apparatus from which a plurality of birds may be suspended each by one leg for presentation successively at one or more stations for treatment, means shiftable for presenting the birds for treatment in the manner aforesaid and having surface portions extending generally vertically for abutting engagement with the legs by which the birds are suspended, pivoted means carried by said shiftable means and having surface portions extending generally vertically for abutting engagement with the legs, certain of said surface portions being coincidental with recess defining walls that present respectively toward others of said surface portions, said recesses being progressively restricted in width each from an open end toward an opposite end, and means for biasing said pivoted means into recess closing positions, pairs of said surface portions being disposed thereby to define leg receiving openings each of a size corresponding to that of a leg wedged in the recess, said pivoted member being operative to releasably retain said leg in wedged engagement with said recess.

4. In a poultry treating apparatus from which a plurality of birds may be suspended each by one leg for presentation successively at one or more stations for treatment, means shiftable for presenting the birds for treatment in the manner aforesaid and having a plurality of outwardly presenting open notches disposed in spaced relation along the peripheral edge thereof for abutting engagement with the legs by which the birds are suspended, latch means carried by said shiftable means and pivotally mounted for abutting engagement with the legs, said notches being gradually reduced in width from their open toward their closed ends, and means for yieldably biasing said latch means toward notch closing positions, pairs of said notches and latch means being disposed thereby to define leg receiving openings each of a size corresponding to that of a leg wedged in the notch, said latch means being operative to releasably retain said leg in wedged engagement with said notch.

5. In a poultry treating apparatus from which a plurality of birds may be suspended each by one leg for presentation successively at one or more stations for treatment, revoluble means for presenting the birds for treatment in the manner aforesaid and having a plurality of outwardly presenting V-shaped notches disposed in spaced relation along the peripheral edge thereof for abutting engagement with the legs by which the birds are suspended, latch means carried by said revoluble member and pivotally mounted close under said revoluble member for abutting engagement with the legs, and spring means for biasing said latch means toward notch closing positions, pairs of said notches and latch means being disposed thereby to define leg receiving openings each of a size corresponding to that of a leg wedge in the notch, said latch means being operative to releasably retain said leg in wedged engagement with said notch.

6. In a poultry treating apparatus as defined in claim 4 wherein the latch means are provided with auxiliary means operative to strike the legs of the birds to dislodge the same from their notches simultaneously as the latch means are opened to release the birds.

References Cited in the file of this patent

UNITED STATES PATENTS

| 573,891 | Martin | Dec. 29, 1896 |
|---|---|---|
| 663,046 | Schaeffer | Dec. 4, 1900 |
| 666,769 | Medearis | Jan. 29, 1901 |
| 1,141,060 | Hobbs | May 25, 1915 |
| 1,694,207 | Coleman | Dec. 4, 1928 |
| 1,761,088 | Pryde | June 3, 1930 |
| 2,116,850 | Rotz | May 10, 1938 |
| 2,161,020 | Crooks | June 6, 1939 |
| 2,485,929 | Siegrist | Oct. 25, 1949 |

FOREIGN PATENTS

| 40,828 | France | May 24, 1932 |